United States Patent [19]
Nekomoto

[11] Patent Number: 5,435,096
[45] Date of Patent: Jul. 25, 1995

[54] NEMATODE AND ARTHROPOD REPELLING APPARATUS

[76] Inventor: Nelson M. Nekomoto, 47-653 Uakea Pl., Kaneohe, Hi. 96744

[21] Appl. No.: 203,392

[22] Filed: Mar. 1, 1994

[51] Int. Cl.⁶ ............................................. A01M 1/22
[52] U.S. Cl. ..................................................... 43/112
[58] Field of Search ........................ 43/112, 124, 132.1

[56] References Cited

U.S. PATENT DOCUMENTS

| | | | |
|---|---|---|---|
| 2,647,228 | 7/1953 | Just | 43/112 |
| 3,504,892 | 4/1970 | Crist | 43/112 |
| 4,241,532 | 12/1980 | Fancy | 43/112 |
| 4,839,984 | 6/1989 | Saunders | 43/112 |
| 4,953,320 | 9/1990 | Nelson | 43/132.1 |
| 5,107,620 | 4/1992 | Mahan | 43/112 |

FOREIGN PATENT DOCUMENTS

| | | | |
|---|---|---|---|
| 2731905 | 7/1977 | Germany | 43/112 |
| 2739165 | 12/1978 | Germany | 43/112 |
| 3935340 | 4/1990 | Germany | 43/112 |
| 443773 | 2/1968 | Switzerland | 43/112 |
| 8803754 | 6/1988 | WIPO | 43/112 |

*Primary Examiner*—Kurt Rowan
*Attorney, Agent, or Firm*—Michael I. Kroll

[57] ABSTRACT

An apparatus and method utilizing a phase-locked high voltage, high-frequency generator or alternator capable of quasi-unlimited power output for feeding electric power into pest-infested earth via an electric conducting wire, for example termite infested ground Utilizing a conventional line power, the power source produces high energy pulses. The pulses are fed into an underground electric conducting wire for application at high voltages. The voltages penetrate the earth and electrocute and repel the nematodes and arthropods contained therein.

4 Claims, 2 Drawing Sheets

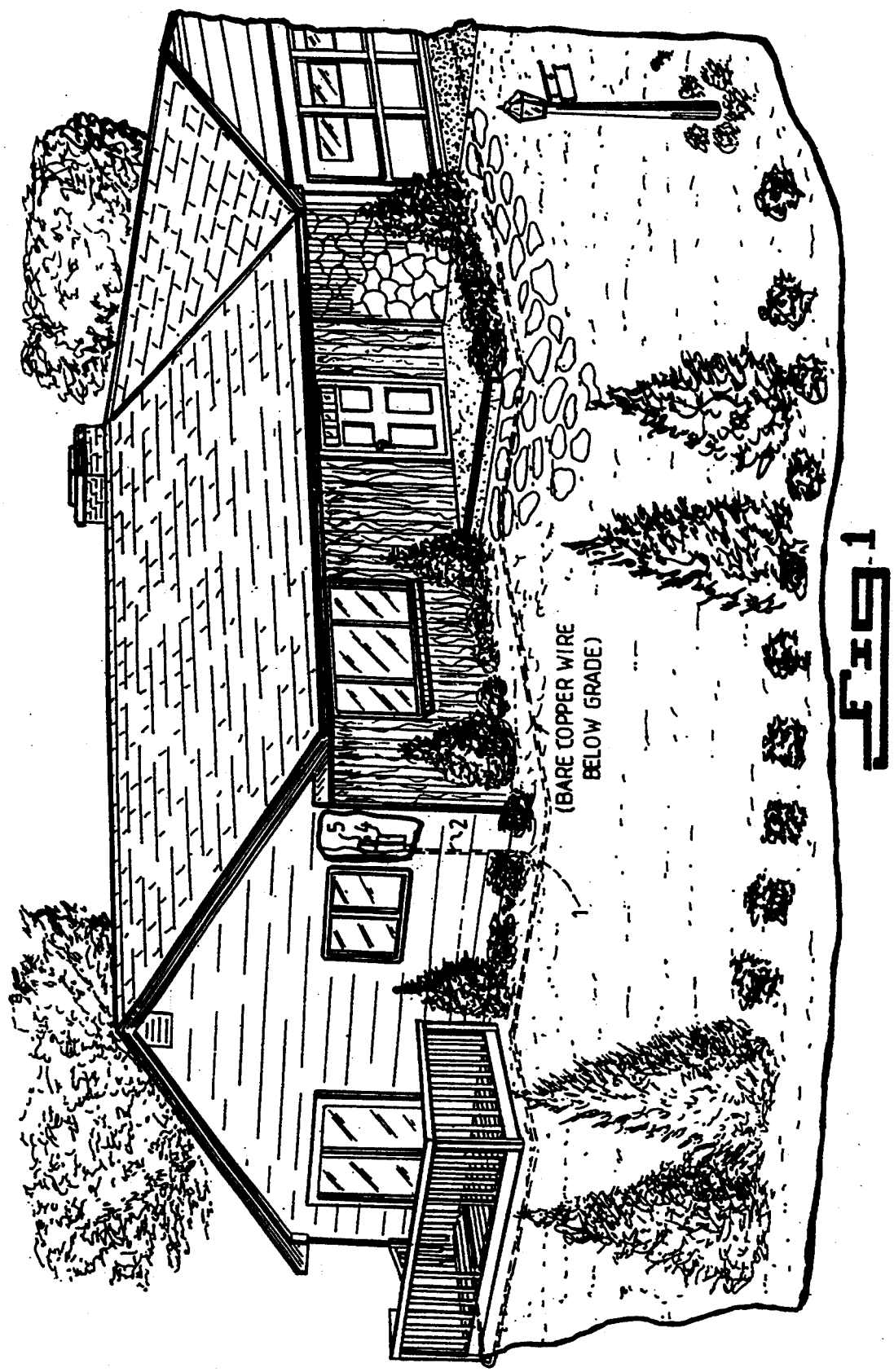

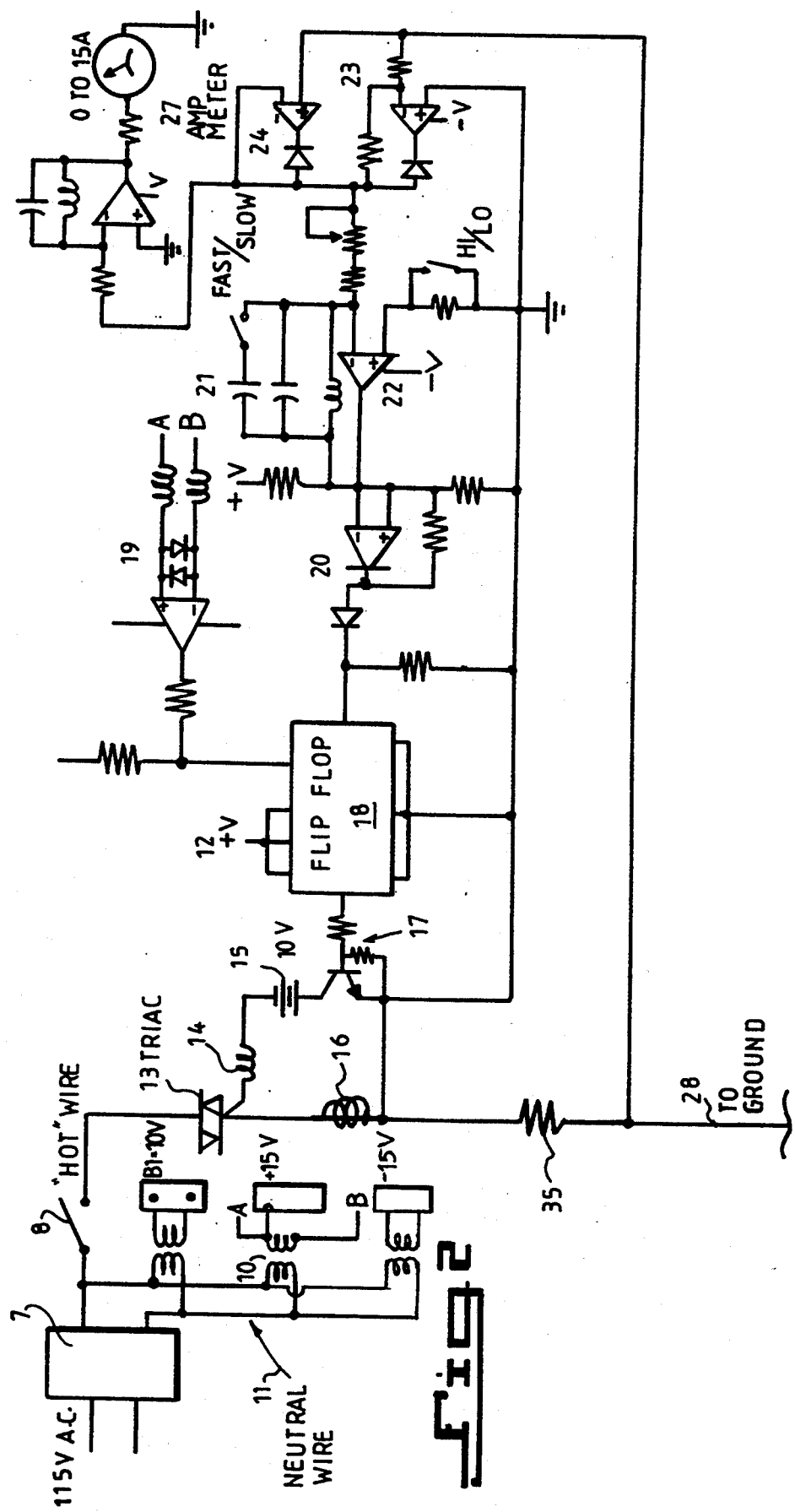

NEMATODE AND ARTHROPOD REPELLING APPARATUS

SUMMARY OF THE INVENTION

This present invention represents a significant improvement over the prior art designs. In contrast to the use of vibrators and oscillators in the earlier systems, power in the present invention is applied to a "hot wire" of a power source directly to a 16 gauge bare copper wire buried underground.

The invention scheme in which the electrical conducting wire is connected directly to the 16 gauge bare copper wire six inches below ground will open a circuit breaker on a 15 ampere line. Thus, to avoid opening the circuit breaker, a triac is added in a series with the hot wire. It is turned on and off to prevent the heating element in the circuit breaker to heat up and cause it to open.

The flip/flop is added to turn off the triac when the power is going through zero. If the triac is turned off while still conducting 15 amperes, the added stress on the component will greatly reduce its life.

The amount of current flow through the sampling resistor is read directly on the 0 to 15 A meter. If the reading is on the low side due to the dryness of the area, the hi/lo switch shall be in the hi position. This hi position will not cause more current to flow but will turn on the triac longer in the on/off sequence. If used in a damp area where it remains similar to Kaneohe, Hi., the switch should be in the lo position.

This system shall be turned on periodically with a computerized timing mechanism with possibly 60 Hz operation.

The invention uses a conductive wire with an elongated loop arrangement external application electrode from one end and the electrode is designed to deliver the energy to an infested earth. Breaking down the dielectric properties of earth, for example, requires a high-power mode; whereas the treatment of voltage-conductive moistened earth requires a lower power level to avoid damaging the apparatus and earth being treated.

The quasi-unlimited power output of this apparatus is useful in large-scale applications. For example, yards and wooded areas infested by termites, beetles, worms and carpenter ants. In large-scale applications, the apparatus can be operated by remote control.

The present invention seeks to overcome the problems of the prior art by providing precise termite protection control.

The present system very carefully lays out a complete electrical conducting loops beneath the earth to ensure that all of the soil beneath the top grade is repeatedly treated.

Accordingly, it is an object of the present invention to provide a means to treat inaccessible areas under the earth with electrical current.

It is another object of the present invention to provide a cost effective means to quickly and inexpensively treat exterior earth portions of building foundations with electrical current.

It is still another object of the present invention to provide a cost effective means for providing protection against termite infestation.

It is still another object of the present invention provide a termite protection system which can be installed with a minimum of effort.

It is yet another object of the present invention to provide a termite protection system which can be installed by a person having no special training or expertise.

It is still another object of the present invention to provide a termite protection system which is reliable in operation.

An advantage of the present invention is that even inaccessible areas under a wooden structure can be treated with termite spray.

A further advantage of the present invention is that labor and other costs associated with treating foundation areas of wooden structures is reduced.

Yet another advantage of the present invention is that the effectiveness of efforts to prevent termite infestation is increased.

Still another advantage of the present invention is that the termite protection system can be easily installed in the earth at the time of construction.

It is yet another object of the present invention to provide a means to periodically retreat earth with the termite control system.

Briefly, the preferred embodiment of the present invention is a system of integrated electrical conducting wire which is installed in the earth structure at the time of construction or thereafter. The system has a minimal number of different type components which fit together easily such that an installer with a minimum of training and skill can quickly and correctly create the system from such components.

A perimeter subsystem having electrical conducting wire positioned to protect an inside perimeter of a structure is connected to the service access assembly.

The termite protection system is sufficiently inexpensive in both hardware costs and installation labor costs to allow the expense of initial installation to be more than recouped from reduced costs of annual servicing, as compared to conventional termite control costs. Significant additional benefit is derived from the increased protection provided by the present invention, as compared to that obtainable through prior art methods.

Still another object of this invention is to provide a termite control system which can be easily installed at the time of construction of the building and is relatively inexpensive and enables efficient control of subterranean termites in order to prevent infestation of wood components of a building.

The present invention provides a method for controlling and eliminating termites and wood-infesting social insects by applying electrical voltage to termite infested areas.

In another aspect, the invention provides an apparatus for applying electric energy to pest-infested structures. The apparatus comprises a electrical conducting wire loop and a source of electric energy. To the source of energy is connected means for generating a voltage electrical current located within the housing. An output electrode is connected to the generating means and extends from the housing. The electrode is disposed so as to deliver electrical current to the infested earth.

In another embodiment, means for generating voltage is provided within the housing. In this version, the electrode is disposed so as to deliver energy at safe power levels to the infested earth.

Those termites near the point of energy application are killed instantly and those located more distantly are eliminated by virtue of the effect of electricity on digestive processes and on feeding of the non-foraging elements of a pest colony.

A second specific means is the use of a portable electrical conducting wire loop whereby high-voltage electric energy is directly contacted to termite infested areas. The natural habitat of termites are galleries bored into wood, and, because of metabolic, feeding and digestive processes, said galleries become moist and enriched with a carbon dioxide atmosphere. Entomologists have established that subterranean termites live in an environment containing up to fifty times the concentration of $CO_2$ present in our atmosphere.

In summary the instant invention applies voltage completely underground and termites located in this area will either surface or scramble out of this area and go elsewhere.

BACKGROUND OF THE INVENTION

This application pertains to termite control.

Previous systems of electric termite control, as described in U.S. Pat. Nos. 4,223,468 and 4,366,644, used vibrators and oscillators for high voltage, high-frequency generation. These devices have limited power output, are prone to breakdowns, and require periodic maintenance.

Termite control has long been a vital commercial business. The annual economic loss from termites is estimated to be close to one billion dollars in this country, including not only damage but cost of treatment.

Moreover, the nature of the business, and the customers' demands and expectations, are such that a 100% success of results is required, even though the treatment is underground and not readily inspectable during the treatment procedure; and if there is any evidence of anything less from a 100% killing of termites, contractors with integrity and business-consciousness have to pay for costly re-treatments, warranty-fulfillments, etc.

Those disadvantages cannot be avoided readily, because the dispensing of an abundant extra, in order to assure a 100% kill, can run afoul of the ever-tightening governmental requirements against pollution and contamination.

The changes in termiticides through the years have caused changes in the amounts of application, and the hazards of soil-contamination of the soil away from the building site. And with increasing awareness of the vital need of better ecological considerations, a factor of increasing vitalness and of increasing awareness now for many years, optimum effectiveness of termiticide procedures has been an increasing yet unsatisfied need of the entire termite control industry.

Subterranean termites enter a wooden structure through holes and cracks in foundations and walls. The art is replete with techniques to prevent their entry.

The better known techniques are not usually long-lived. Foundations, for example, can and do crack, enabling the termites to enter the structure. Heaving of the ground or growth of roots often create voids through which the termites pass. There remains a need for an inexpensive, easily installed barrier which can withstand disruptive forces, discourage the entry of roots through it, and prevent the passage of termites.

The extermination industry has long relied on insecticides applied as sprays or streams. These are very cost effective, and over the years have not caused much objection. However, as awareness has grown about the potentially harmful effects of insecticides, resistance has arisen to their continued use, especially by chemically-sensitive persons.

In view of this increased awareness, it is surprising that with the advantages offered by the process described in the article, there has been no commercial use made of this technique, at least to the knowledge of the present applicants. Upon reflection, the applicants have concluded that it has suffered from lack of simple method of application, and also from means to keep the barrier in place and the conformity with adjacent structures once it is applied.

It is an object of this invention to provide a conveniently installed barrier to passage of termites, and methods and constructions which assure its long-lived effectiveness.

The invention relates to a method and apparatus for preventing termites and other crawling insects from entering, for example, houses or other structures inhabited or occupied by people and/or animals, and more particularly, relates to a method and apparatus for preventing termites from entering residential structures, commercial structures and industrial structures which structures are mounted on support and associated structures connected to ground.

At the present time, most residential structures, commercial structures, and industrial structures, which are mounted on support and associated structures, utilize highly toxic poisons and other devices placed across the insect pathway to prevent termites and other crawling insects and pests from reaching the residential, commercial, and industrial structures. This is particularly the case where termite or insect intrusion could cause structural damage and/or physical or emotional problems to people and/or animals inhabiting or working in the structure. With most of the current methods, the user or a contracted service must periodically replace the toxic substances in order to preclude termites and/or other crawling insects. The most effective toxic substance, chlordane, has recently been banned by the Environmental Protection Agency.

Therefore, it is an object of the present invention to provide a mechanical assembly mounted above ground on support and/or associated structures. This assembly has physical and other barriers arranged in a particular manner for preventing termites from reaching critical areas of residential structures, commercial structures, and industrial structures.

It is a further object of the present invention to provide unobtrusive devices that are relatively inexpensive, easy to install, quick to maintain, and environmentally safe, while having physical and other barriers for preventing termites from reaching critical area of residential structures, commercial structures, and industrial structures.

It is a further object of the invention to utilize a bonding agent to provide an imperious bond between the assembly and the support and associated structures. The purpose of the bonding agent is to seal off any spaces, between the assembly and the support and associated structures, which would have permitted the termites to bypass the invention and thereby gain access to the residential structures, commercial structures, and industrial structures.

It is also an object of the invention to provide an assembly which may be utilized on new construction, as a retrofit on existing structures, or as an integral portion of manufactured or modular structures at the time the structures are originally manufactured.

The invention concerns controlling of termites in building construction. Termites, insects of the order isoptera, have about 2,000 species, about 200 of which are known to be pests and cause damage to crops, buildings and furniture. Termite distribution is primarily tropical. They are also prevalent in the subtropics and temperate zones. In North American they reach as far north as Main and Vancouver.

The present invention is directed to subterranean dwelling species, which are dependent on moisture in the soil and which reach and destroy buildings and furnishings through foundations, either by wood in contact with soil, or by cracks in slabs and foundations. Termite nymphs divide into worker, soldier and alates or reproductors. New colonies are established by winged adults who are weak flyers, often blown in the wind for a few yards or hundreds of feet. The alight, shed their wings, pair and nest in soft wood or soil. The nests are sealed to preserve moisture. A first batch of eggs is laid, and in two to five years a colony matures. The queen may become as large as four inches long, laying more than 30,000 eggs a day during a lifetime, which may stretch over 20 or more years. The tendency of colonies to establish close to each other and the rapid development of established colonies cause the species to become extremely destructive. The termites are equipped with mouth parts for chewing wood, and their guts contain protozoans for dissolving wood. Once colonies are well established, it is difficult to destroy them.

Many systems have been devised for destroying wood dwelling termites. The most satisfactory may be expensive and difficult fumigations. Subterranean termites are mostly attacked by poisoning the ground before construction and filling a trench around a construction with chemicals, usually chlorinated hydrocarbons. Some below-ground pipe systems have been proposed, which install rigid pipes beneath the surface of the ground, especially beneath vertical walls. Insecticides are periodically released from the pipes.

Many present inventions remain with termite control. Foremost of the problems is the need to control termites with a minimal level of chemicals so that the chemicals do not migrate to ground water and cause long-term pollution. Another problem that exists is the distribution of termite control chemicals in a suitable manner to ensure destruction of all termites without overloading a ground system with the chemicals. Problems exist in ensuring against penetrations of slabs and foundations by unobserved cracks.

The predominant current usage of the permanent termite protection system of the present invention is as a fixture which is installed in wooden structures at the time of their construction.

The problem of damage caused to wooden structures by termites is not a new one.

Currently, a pest control technician usually uses a hand carrier sprayer to deposit the chemicals around the perimeter of the structure and onto those areas underneath the structure that can be reached by means of crawl spaces and the like. However, all too frequently, large areas under the structure cannot be reached by this means at all. More importantly, such areas are often some of most prone to termite infestation due to the fact that are particularly dark, damp, and secluded. Not only is this method ineffective because it does not reach some of the most needed locations, it is expensive. The time and effort required to accomplish this job is significant. Because of the expense involved, and because termite damage is one of those things that is far too easy to ignore until it too late, many home owners either neglect the task of termite control entirely or else they may attend to it all too infrequently.

An alternative method of termite control it to "tent" an entire structure and then to fumigate with the tent. Of course, the disadvantages in inconvenience to the residents of the extreme measure are obvious. Furthermore, this method is intended primarily to kill existing infestations, and is not very effective as a measure to provide long term protection. Certainly, it would be better to prevent the termite infestation which necessitates the need for this drastic sort of remedial action by regularly treating foundation areas of the structure with termite pesticides.

The principle of current enhancement by use of high voltage multi-frequency energy, calculated to deliver maximum electrical kill-energy at low power levels. Those termites near the point of energy application are killed instantly. Those more distant are eliminated by virtue of the effect of electrical energy on digestive processes and on feeding of the non-foraging elements of a social pest colony.

Energy can be applies at any point along the galleries and tubes or directly into the nest. Once the nest is located, an electrode is injected into it and the pests are eliminated by applying either the high-voltage radio frequency energy or the high-voltage multi-frequency electric energy directly to the electrode. Application of electricity to the nest has the effect of killing the queen termite, causing the colony to cease foraging and die out.

The proper magnitude of electric treatment power is monitored by the operator by use of accessories having visual indicators such as meters or incandescent lights. Also utilized with the probe gun and associated circuitry of the present invention is a dynamic conductance-test circuit, which by means of a calibrated or standard test specimen such as wood, permits the setting of proper power levels for the probe gun with regard to expected treatment conditions.

They are widely distributed in tropical countries, but also occur in the temperate parts of North and South America and a few have established themselves in Europe. Their food consists for the most part of wood, especially in a state of incipient decay, but they also eat a great variety of sub stances. The termite society consists for the most part of workers, wingless, sexually immature individuals. Besides these workers there is a less numerous caste of large-headed, blind strong-jawed soldiers. The workers collect food, form nests and tunnels, and care for the males, females, eggs, and larvae. The males and females have wings, which the latter lose after impregnation. Then, the female or queen undergoes a remarkable change, becoming enormously distended with eggs. The queen is extremely prolific, having been known to lay 60 eggs in a minute. In the spring the young winged males and females leave the nest in a swarm, after which pairing takes place; the survivors becoming the parents of new colonies.

Termites, the world over, are the most destructive of insect species attacking wood and cellulose products. Millions of dollars are lost annually in the United States as a direct result of termite damage by the subterranean termite. One of the most destructive subterranean species, *Reticulitermes flavipes* (Kollar), has established itself in the populous northeastern Unites States. Of the fifteen species of subterranean termites considered to be pests of major economic importance, four species of Reticulitermes, *R. flavipes, R. hesperus, R. hageni,* and *R. virginicus,* are responsible for most of the damage.

DISCUSSION OF THE PRIOR ART

Prior to U.S. Pat. No. 3,602,248, issued Aug. 31, 1971, discloses a termite control system in which an underground tube system is associated with a concrete slab-type foundation. Prior to U.S. Pat. No. 4,297,055, issued Oct. 17, 1981, discloses a technique by which an underground tube can be inserted under an existing concrete foundation. The prior patents cited and made record in the above-mentioned patents and the following U.S. patents relate to this field of endeavor:

U.S. Pat. No. 2,842,892; Jul. 15, 1958
U.S. Pat. No. 2,915,848; Dec. 8, 1959
U.S. Pat. No. 3,330,062; Jul. 11, 1967
U.S. Pat. No. 3,513,586; May 26, 1970
U.S. Pat. No. 3,909,975; Oct. 7, 1975
U.S. Pat. No. 4,043,073; Aug. 23, 1977

While the above discussed and listed patents relate to this field of endeavor, they do not disclose the tube system utilized in this invention.

The following is a discussion of patents which have been cited with reference to insect control apparatus or methods thereof.

George Mountain, U.S. Pat. No. 4,858,375

Termite Control Apparatus

Applicator apparatus for termite control, including an end-pointed applicator pipe with pump means for supplying the applicator pipe with termiticide liquid under pressure; and adjacent the lower end of the pipe is a pattern or plurality of outlet holes, the holes being located in a span of about 90 degrees of the circumference of the pipe, providing an effective distribution of termiticide along the wall of the structure being treated.

Walter Ebeling, Charles F. Forbes, U.S. Pat. No.: 4,823,520

Granular Termite Barrier

A method of protecting a foundation wall from termites in which a barrier of sand of granule sizes which bar the passage of termites is placed contiguous to the wall. An impermeable structural barrier is embedded in the sand with a projecting upper edge. A concrete cap is poured atop the sand the cover it and encapsulate the upper edge of the barrier.

Herbert H. Hand, Herbert G. Hand, U.S. Pat. No.: 5,097,641

Method and Apparatus for Preventing Termites, Crawling Insects or Other Crawling Pests From Entering Residential Structures, Commercial Structures and Industrial Structures A termite pest prevents for placement between the ground and a residential, commercial, or industrial structures mounted above ground such a way that termites, crawling insects, or pests are prevented from entering the aforementioned structures. A combination of tactic, ultraviolet light and other barriers are positioned with respect to the path of travel of the termite or insect from ground to the residential, commercial or industrial structure.

Betty G. Barbett, U.S. Pat. No. 5,007,197

Termite Control System

A method and apparatus a termite treatment, comprising first determining proper spacing for the drip tubing by using a sample of the drip tubing on compacted soil in a slab area to determine rate of water movement into the soil. Then based on this predetermined distance, the drip tubing is placed on top of the soil with openings of the tubing facing downward. The first and second ends of this tubing are exposed and extend outward from the slab area. This tubing is covered with sand, the sand is then covered with a vapor barrier, and this vapor barrier is covered with gravel. Cement is the poured on top of the gravel and vapor barrier, thereby forming a slab. The insecticide is released through the drip tubing into the soil beneath the slab.

Robert A. Fletscher, U.S. Pat. No. 5,184,418

Permanent Termite Protection System

A termite protection system for a wooden foundation structure is disclosed having plurality of perimeter pipe sections which include integral nozzles orifices, and a plurality of interior pipes with non-integral nozzles, for distributing a delivering termite control fluids. The pipes and each have a plurality of male ends which can be permanently inserted into a female end of another pipe or accessory fittings such as "T" fittings and elbow fittings. Longitudinal ridges within each of the male ends fit into receiver grooves in each of the female ends as an aid to orientation of the other components. The female ends have interior locking teeth for locking into ridge indentations on the male sections such that components snap together and cannot be easily disassembled. Fluids are introduced into the termite control system through a service access unit having a front plate which has thereon data obtained from an initial system calibration such that service personnel will be informed as to the quantity of fluid and delivery pressure required to adequately protect the structure from termite infestation.

Richard C. Peacock, U.S. Pat. No. 4,625,474

Tube-type Termite Control System

A termite control system utilizing an underground tube associated with underground or ground contacting foundation components of a building with the tube having discharge openings by which insecticide may be discharged into ground areas adjacent the foundation of a building or the like for control of subterranean termites. In one embodiment, the tube system is associated with a posted or pier construction supporting a wood or composite floor. In a second other embodiment, the tube system encircles a pole-type foundation or support. In a third embodiment of the invention, the tube system is associated with a retaining bearing wall which has backfill dirt associated therewith. In each embodiment, the tubes are provided with radial slits to discharge insecticide therefrom with at least one end of the tube or tubes extending to a position accessible from a point above ground to level enable insecticide to be pumped into the tubes under predetermined pressure.

Lucas G. Lawrence, U.S. Pat. No. 4,366,644

Method and Apparatus for Termite Control

An apparatus and method for controlling pests, particularly termites. The method involves the application of broad band radio frequency or multi-frequency high-voltage electrical energy to termite shelter tubes, galleries and nests and to the bodies of the termites themselves. Killing of termites is accomplished directly by electroshock and indirectly by interference with the digestive process of the termites. The apparatus is a probe gun incorporating circuitry for generating an electric signal having a voltage in the 100,000 volt range and a frequency range of 0–500 KHz.

Mario J. Basile, U.S. Pat. No. 4,043,073

Method of Treating Soil for Controlling Termites and the Like

A soil or other ground cover is treated for termite or other pest control by dispensing in the soil or on the ground, a toxic insecticide in an active available state and a toxic insecticide in an initially unavailable state and timed to be released before complete dissipation of the immediately available insecticide. The initially unavailable insecticide is enveloped in a container made of a material either whole, in part attractive to and edible by the pest to release the insecticide when the container or plug is eaten by the pest. Combined with the insecticide is any odoriferous material which will signal the presence of termites by its distinctive odor. A soil coloring agent can be used also in addition to provide a visual signal. The odor producing agent can be used alone.

Lucas G. Lawrence, U.S. Pat. No. 4,223,468

Method and Apparatus for Termite Control

An apparatus and method for controlling pests, particularly termites. The method involves the application of broad band radio frequency or mutli-frequency high-voltage electrical energy to termite shelter tubes, galleries and nests and to the bodies of the termites themselves. Killing of termites is accomplished directly by electroshock and indirectly by interference with the digestive process of the termites. The apparatus is a probe gun incorporating circuitry for generating an electric signal having a voltage in the 100,000 volt range and a frequency range of 0–500 KHz.

Floyd Lerey Balley, U.S. Pat. No. 3,858,346

Control of Subterranean Termites

Control of subterranean termites in buildings is carried out by impregnating at least the exposed lower timbers of the building with termiticidally effective amount of hexachlorocyclopenadiene dimer in a liquid organic solvent carrier. Preferably, termite infestation in the ground under and surrounding the building is also controlled by baiting. The bait consists of a termite-attracting carbohydrate carrier containing a termiticidally effective amount hexachlorocyclopenadiene dimer. For baiting, it is only necessary to make holes in the ground at 1–2 yard intervals and insert 10–20 grams of the bait into each hole.

Mario J. Basile, U.S. Pat. No. 3,835,578

Method of Treating Soil for Controlling Termites and the Like

A soil is treated for termite or like control by dispensing in the soil a termite toxic insecticide in an active available state and timed to be released before complete dissipation of the immediately available insecticide. The initially unavailable insecticide is enveloped in a metal container which corrodes in the soil environment or in a synthetic organic polymeric resin envelope which is degraded to release the insecticide shortly before dissipation of the initially available insecticide to increase the time of termite inhibition in the soil, or in a metal container which corrodes and an organic polymeric resin plug, which plug is attractive to and edible by the termites.

Osamu Kondo, U.S. Pat. No. 4,917,299

Method for Spraying Anti-Termite Agent and the Apparatus Therefor

A spray nozzle for spraying anti-termite agent has a base portion including a supply portion having generally cylindrical shape and being formed with one or a plurality of jetting ports at one side end in the axial direction of the supply portion, and a horn portion having one end portion attached to the jetting ports side of the base portion. The horn portion has a plurality of air suction holes peripherally at an adjacent position where the jetting ports situated about the axial direction thereof, and air is sucked by utilizing the Venturi effect of jet streams of the agent in order to spray the agent in bubble form.

Herbert H. Hand, Herbert G. Hand, U.S. Pat. No.: 5,097,641

Method and Apparatus for Preventing Termites, Crawling Insects or Other Crawling Pests From Entering Residential Structures, Commercial Structures and Industrial Structures A termite pest prevents for placement between the ground and a residential, commercial, or industrial structures mounted above ground such a way that termites, crawling insects, or pests are prevented from entering the aforementioned structures. A combination of tactic, ultraviolet light and other barriers are positioned with respect to the path of travel of the termite or insect from ground to the residential, commercial or industrial structure.

Lucas G. Lawrence, U.S. Pat. No. 4,782,623

Method and Apparatus for Termite Control

An apparatus and method utilizing a phase-locked high voltage, high-frequency pulse generator capable of quasi-unlimited power output and an applicator gun for feeding electric power into pest-infested dielectrics, for example termite infested wood. Utilizing a conventional line frequency of 50 or 60 Hz, the generator produces high energy pulses. The pulses are fed into an applicator gun for application at high voltages. The voltages penetrate dielectrics and electrocute the pests inside.

Lucas G. Lawrence, U.S. Pat. No. 4,223,468

Method and Apparatus for Termite Control

An apparatus and method for controlling pests, particularly termites. The method involves the application of broad band radio frequency or mutli-frequency high-voltage electrical energy to termite shelter tubes, galleries and nests and to the bodies of the termites themselves. Killing of termites is accomplished directly by electroshock and indirectly by interference with the digestive process of the termites. The apparatus is a probe gun incorporating circuitry for generating an electric signal having a voltage in the 100,000 volt range and a frequency range of 0–500 KHz.

Roland S. Twydell, Jennifer M. Radeliffe, U.S. Pat. No. 4,833,158

Method of Combating Termites

This invention provides a method of combating termites at a locus, which comprises treating the locus e.g. soil or timber with an acyl urea of the formula wherein on substituent X is a halogen atom or a methyl group and the other is a halogen atom, a hydrogen atom or a methyl group, and each of R1, R2, and R3 independently represents a hydrogen or fluorine atom; the use of acyl ureas of formula I for combating termites; and compositions for protecting timber against termite attack.

Henry A. Brewsing, U.S. Pat. No. 5,026,734

Method of Controlling Fungus, Mites, Worms, Termites, Nematodes and Other Insects This invention relates to the discovery that a very particular kind of nonionic surfactant, namely an alkyloxypolyethyleneoxyethanol can be used as the sole active ingredient to control fungus, mites, worms, termites, nematodes, and other insects. It is believed that these alkyloxypolyethyleneoxyethanois can be represented by a formula. Method of Controlling Termites. A method of controlling termites employing substituted phenoxy, phenylthio and anilino compounds.

Winston J. Brill; William C. von Meyer, U.S. Pat. No. 4,504,468

Method and Composition for control of Termite and Shipworms

A composition and method for control of animal pests capable of nitrogen fixation is disclosed in which the active ingredient is a metal compound of either molybdenum or tungsten. It is disclosed that such metal salts of molybdenum and tungsten are uniquely toxic to termites and shipworms in low dosages. The composition can be incorporated into direct control agents, termite, baits, soil inoculants, or maybe incorporated with other ingredients in a wood treating dip or pressure treating composition for wood preservation.

BRIEF DESCRIPTION OF THE DRAWINGS

FIG. 1: is a perspective view of a typical house showing the underground electrical conducting wire in a looped fashion surrounding the perimeter of the house. The electrical conducting wire is connected to the power source and pulsator located inside the structure.

FIG. 2: is a diagrammatic scheme in which the electrical conducting wire is connected directly to the 16 gauge bare copper wire six inches below ground will open a circuit breaker on a 15 ampere line. Thus, to avoid opening the circuit breaker, a triac is added in a series with the hot wire. It is turned on and off to prevent the heating element in the circuit breaker to heat up and cause it to open.

LIST OF REFERENCE NUMBERS

1. Conductive wire
2. Splice
4. Circuit breaker
5. Power source
6. Resistor
7. Power source
8. Switch
9. Generator
10. Transformer
11. Neutral wire
12. Positive feed
13. Triac
14. Resistor
15. Isolated secondary of transformer
16. Resistors
17. Resistor
18. Flip/flop
19. Amplifier
20. Amplifier
21. Secondary switch
22. Hi/Lo switch
23. Amplifier
24. Amplifier
25. Conductor
26. 15 Ampere line
27. Meter
28. Ground
29. Resistor
30. Resistor
31. Diode
32. Diode
33. Resistor
34. Diode
35. Sampling resistor

DESCRIPTION OF THE PREFERRED EMBODIMENTS

A House showing the underground electrical conducting wire 1 in a looped fashion surrounding the perimeter of the house. The electrical conducting wire is connected by splice 2 to the power source 4, 5, 7 located inside the structure. A diagrammatic scheme in which the electrical conducting wire 1 is connected directly to the 16 gauge bare copper wire six inches below ground will open a circuit breaker on a 15 ampere line. Thus, to avoid opening the circuit breaker, a triac 13 is added in a series with the hot wire. It is turned on and off by a flip/flop switch 18 to prevent the heating element in the circuit breaker to heat up and cause it to open. A secondary switch 21 is spliced into the circuitry. Numerous amplifiers 19, 20, 22, 23, and 24 are also present. A ground wire 28 connects to the 16 gauge bare copper wire buried underground. A neutral wire 11 and auxiliary battery 15 with positive feed 12 are presented in the schematic. A conductor 25 is linked in a series to the amplifier.

The flip/flop 18 is added to turn off the triac when the power is going through zero. If the triac 13 is turned off while still conducting 15 amperes, the added stress on the component will greatly reduce its life.

The amount of current flow through the sampling resistor 35 is read directly on the 0 to 15 A meter 27. If the reading is on the low side due to the dryness of the area, the hi/lo switch 22 shall be in the hi position. This hi position will not cause more current to flow but will turn on the triac 13 longer in the on/off sequence. If used in a damp area where it remains similar to Kaneohe, Hi., the hi/lo switch should be in the lo position.

The negative voltage generator 9 or alternator 10 was devised only because the expense of a three output secondary transformer. A two output transformer is readily available and cheaper. Rather than using a single output transformer with a rectifier/voltage regulator combination, it is more reliable to generate a negative voltage from the 15 V supply.

This system shall be turned on periodically with a computerized timing mechanism.

I claim:

1. A nematode and arthropod repelling device comprising the following components:
   a conductive wire buried in earth which may be infested with termites arranged in a loop surrounding structure and directly connected to a power source of electrical current, said power source containing a circuit breaker, means to reduce or increase current to said conductive wire depending on moisture levels within the earth surrounding said conductive wire, triac means in series with said conductive wire to avoid opening said circuit breaker, and flip/flop switch means to turn off said triac means when current flow is passing through zero.

2. A nematode and arthropod repelling device as described in claim 1, whereas said conductive wire may be 16 gauge.

3. A nematode and arthropod repelling device as described in claim 1, whereas said power source may have at least one hi/lo switch.

4. A nematode and arthropod repelling device as described in claim 3, whereas said power source may have at least one sampling resistor which is read directly on an ammeter, if an ammeter reading is on the low side of the "normal" limits due to lack of moisture in the earth surrounding said conductive wire, the hi/lo switch shall be in the hi position and will not cause more current to flow but will turn on the triac longer in an on/off sequence.

* * * * *